Sept. 19, 1950     C. L. HENDERSON     2,523,018
METHOD OF CYLINDER ETCHING AND MACHINE THEREFOR
Filed Dec. 12, 1946                                      5 Sheets—Sheet 1

INVENTOR.
Charles L. Henderson
BY
Soans, Pond & Anderson
Attys.

Sept. 19, 1950 C. L. HENDERSON 2,523,018
METHOD OF CYLINDER ETCHING AND MACHINE THEREFOR
Filed Dec. 12, 1946 5 Sheets-Sheet 2

INVENTOR.
Charles L. Henderson
BY
Doane, Pond & Anderson
Attys.

Sept. 19, 1950     C. L. HENDERSON     2,523,018
METHOD OF CYLINDER ETCHING AND MACHINE THEREFOR
Filed Dec. 12, 1946     5 Sheets-Sheet 3

INVENTOR.
Charles L. Henderson
BY
Doane, Pond & Anderson
Attys.

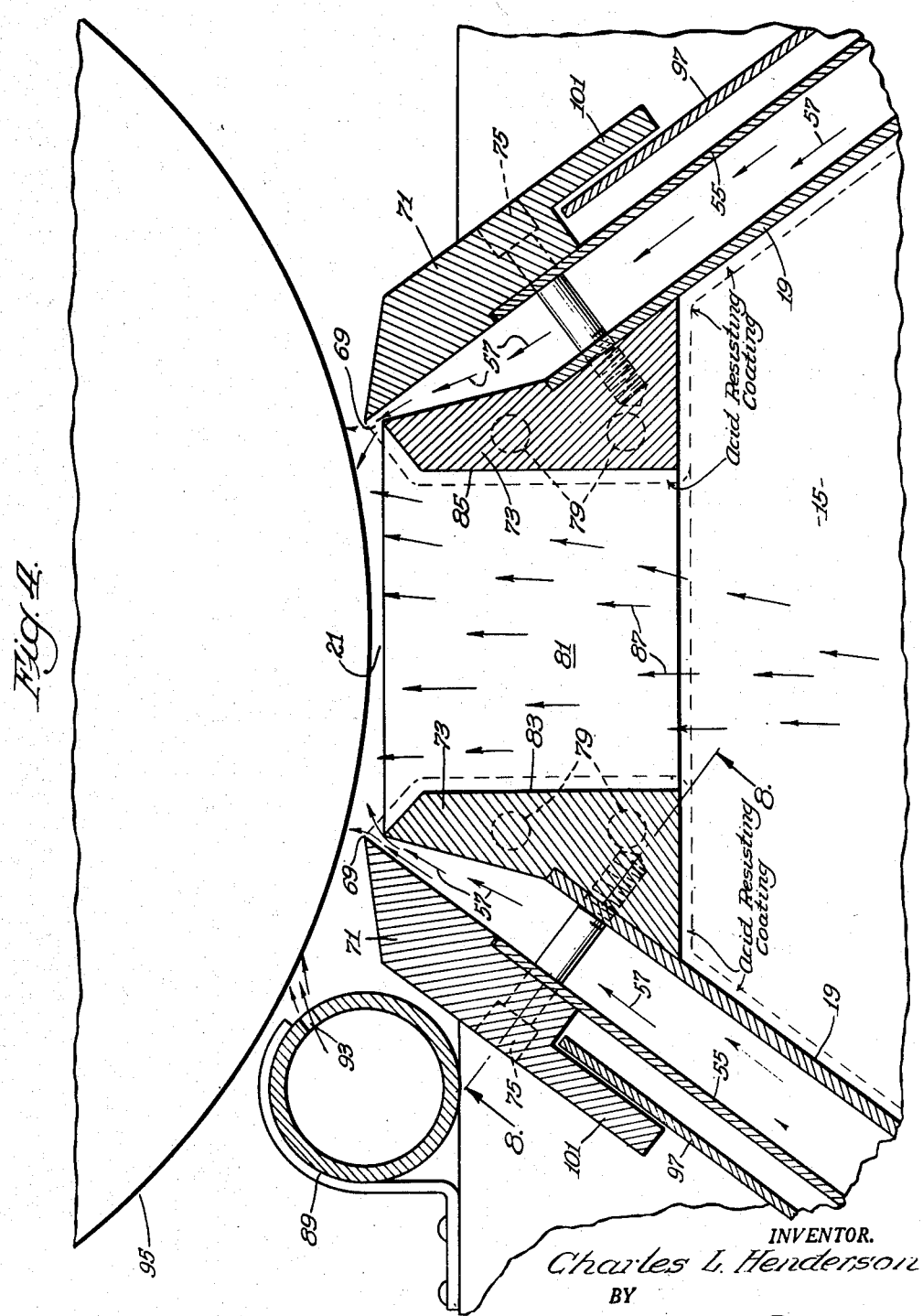

Sept. 19, 1950        C. L. HENDERSON        2,523,018
METHOD OF CYLINDER ETCHING AND MACHINE THEREFOR
Filed Dec. 12, 1946        5 Sheets-Sheet 5
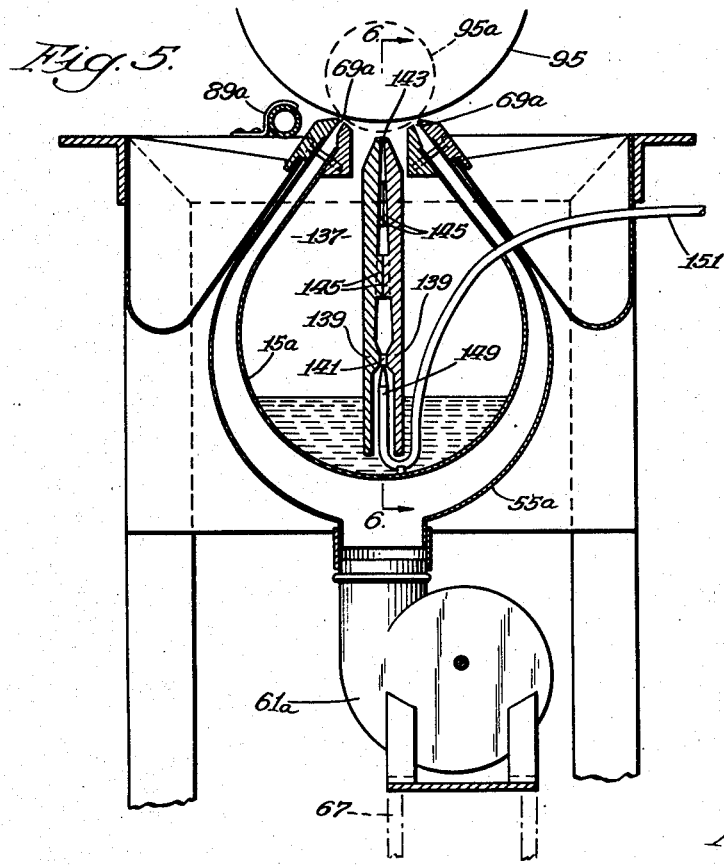
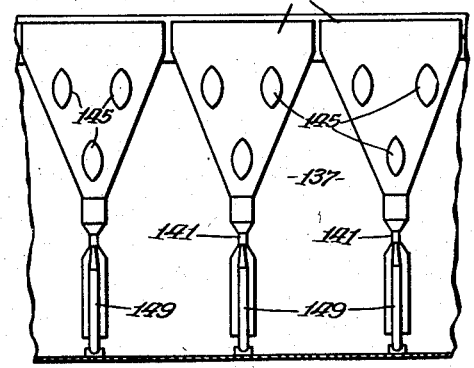
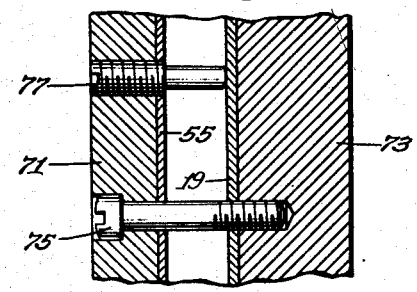
INVENTOR.
Charles L. Henderson
BY
Soans, Pond & Anderson
Attys.

Patented Sept. 19, 1950

2,523,018

UNITED STATES PATENT OFFICE 2,523,018

METHOD OF CYLINDER ETCHING AND MACHINE THEREFOR

Charles L. Henderson, Appleton, Wis., assignor to Paper Patents Company, a corporation of Wisconsin Application December 12, 1946, Serial No. 715,893

6 Claims. (Cl. 41—39)

The present invention relates particularly to improved apparatus and methods for etching intaglio or relief printing cylinders.

In intaglio printing the printing surface ordinarily comprises a smooth, metallic surface, usually of copper, having etched therein, symmetrically arranged ink-receiving recesses of very small area. The ink recesses throughout the printing surface are separated by line-like, unetched lands, which serve to support the doctor or scraper blade used for removing excess ink from the printing surface during the actual printing operation.

The quality of the printing surface is to a large extent dependent upon the obtaining of a uniformly etched surface during the etching operation. Various methods and procedures have been developed for etching printing surfaces. The etching machine and the method disclosed in my prior Patent 2,360,676 make possible continuous, mechanical etching procedures, which are important steps forward in the art.

The present invention is an improvement on the apparatus and method of my prior patent, and has for its principal object the provision of a machine and method whereby the progress of the etching on the printing surface can be closely controlled so that a more uniformly etched surface, having very accurate tonal quality, will be produced. Other objects and advantages of the invention will be made clear by reference to the accompanying drawings and the following description of one preferred embodiment thereof.

In the drawings,

Fig. 4 is an enlarged, fragmentary, sectional view of the improved etching fluid control means of the present invention;

Fig. 5 is a sectional view generally similar to Fig. 3 showing a modified form of the apparatus of the present invention;

Fig. 6 is a view taken on line 6—6 of Fig. 5;

Fig. 7 is a fragmentary, perspective view illustrating one means of adapting the apparatus of the other figures of the drawings for use in connection with short printing cylinders, and;

Fig. 8 is a sectional view taken on line 8—8 in Fig. 4.

Figure 1:
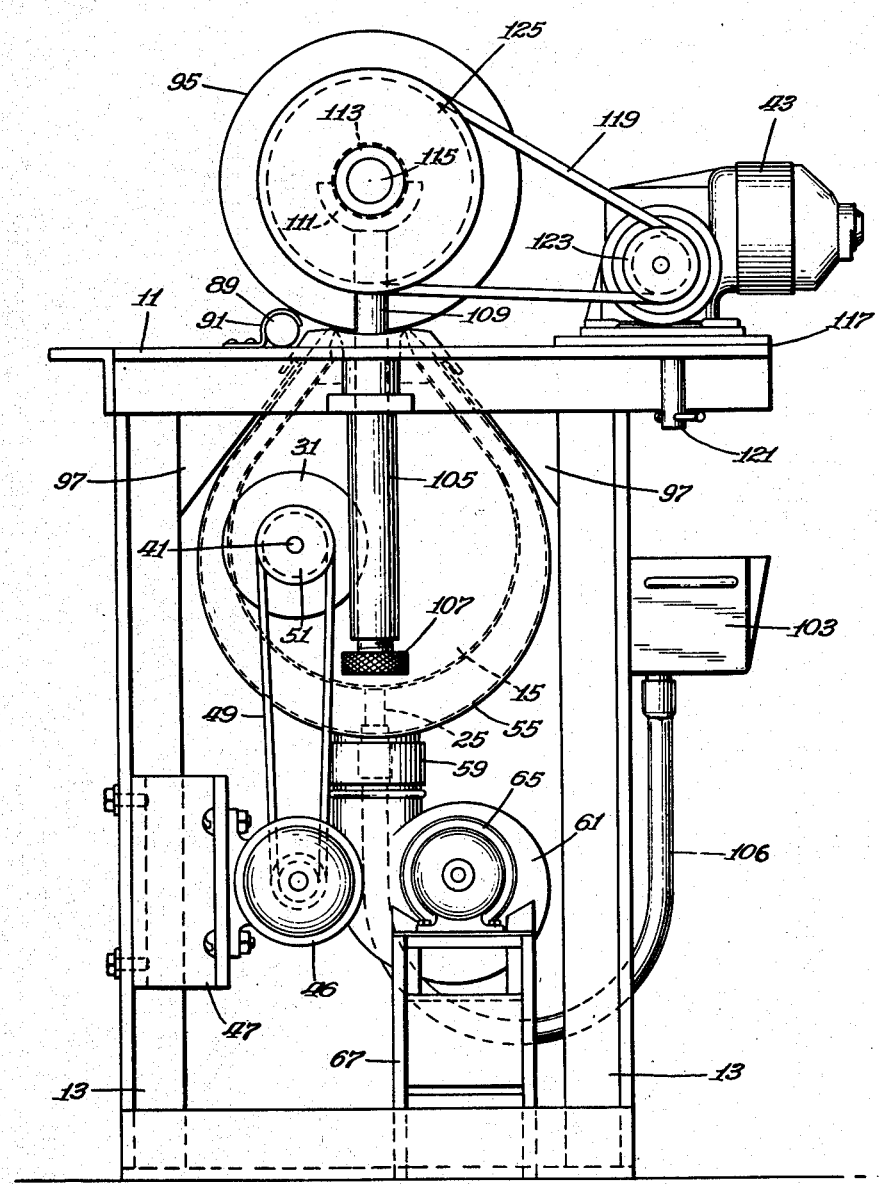
Fig. 1 is an end elevational view, partially in section, of an etching machine constructed in accordance with the present invention.

The etching machine illustrated in the drawing is designed particularly for etching printing cylinders of standard sizes, and comprises generally a relatively heavy frame structure; a pair of bearings, adjustably supported on columns, for rotatably supporting the printing cylinder which is to be etched; means for rotating the printing cylinder; a container for the acid or other etching fluid; means for applying said fluid to the printing cylinder; and means for controlling the area on which the etching fluid acts and, also, the time of contact between the etching fluid and the surface being etched. The means for controlling the action of the etching fluid are particularly important features of the improved machine. In effecting this control, barriers of pressure air are utilized to limit the area of the cylinder subjected to the etching fluid, and this same air barrier is also used to doctor off excess etching fluid. A water spray is used to check the action of the etching fluid at times when the surface of the cylinder is not in contact with the fluid. Thus, the need for doctor blades or rollers which mechanically contact the surface to be etched is eliminated, and the surface being etched comes in contact with only etching fluid, air and wash water.

The frame structure illustrated, includes a heavy rectangular frame 11 which is supported upon upright members 13. The frame members 11 and 13 are desirably of relatively heavy structural steel and are covered with an acid-resisting coating at all points where there is possibility of contact with the etching fluid. Suitable platforms are included on the frame to provide support for the driving motors and other associated apparatus.

An etching fluid or acid tank 15 extends longitudinally to the frame and is supported at the ends and the various points along its length as necessary to provide a rigid structure. The acid tank 15 is desirably shaped as is illustrated in the drawings, and has a longitudinally extending shell portion 16 having an arcuate section 17 extending for approximately 260° around the bottom of the shell 16 and relatively straight side portions 19 which converge to form a longitudinally extending throat 21 having an opening about four inches wide. The ends 23 of the container 15 are plane surfaces and are desirably bolted to the longitudinal shell portion 16. The acid tank ends 23 are adapted to be supported upon end members of the rectangular frame 11. An acid inlet 25 is provided in the bottom of the acid tank 15 as illustrated in the drawings. The inner portion of the tank 15 and the acid inlet 25 should be covered by a suitable acid-resisting material as, for example, a ⅛ inch coating of pure black gum rubber or a suitable acid-resisting paint or cement.

A large circular portion, indicated at 22, is cut out of each of the end sections 23 to provide a means of access to the interior of the acid tank 15 and means for removing or servicing an impeller member 29 which is to be hereinafter described in detail. The openings resulting from the cut-out portions 22 are sealed by removable plate members 31 which contain bearings 33 for rotatably supporting the shaft for the impeller 29. A seal between the plate members 31 and the end sections 23 of the acid container 15 is provided by inserting a rubber gasket 35 between the plate members 31 and the end sections 23 of the acid tank 15. The gasket 35 acts as an extension of the rubber or other acid proof coating provided on the inner surface of the acid container and thus insures that the metal will not be exposed to the action of the etching fluid.

Figure 2:
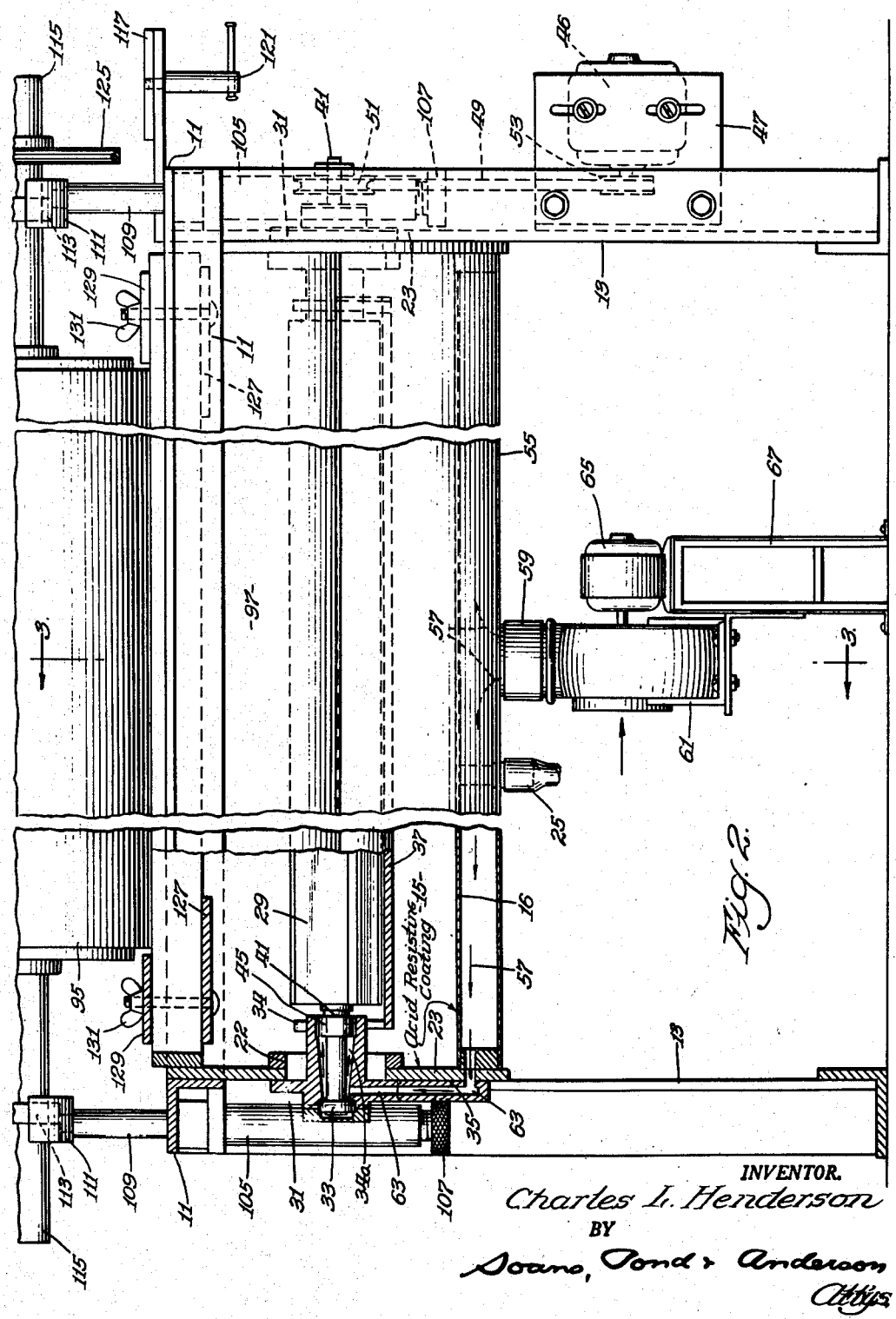
Fig. 2 is a fragmentary side elevational view, partially in section, of the etching machine illustrated in Fig. 1.
Figure 3:
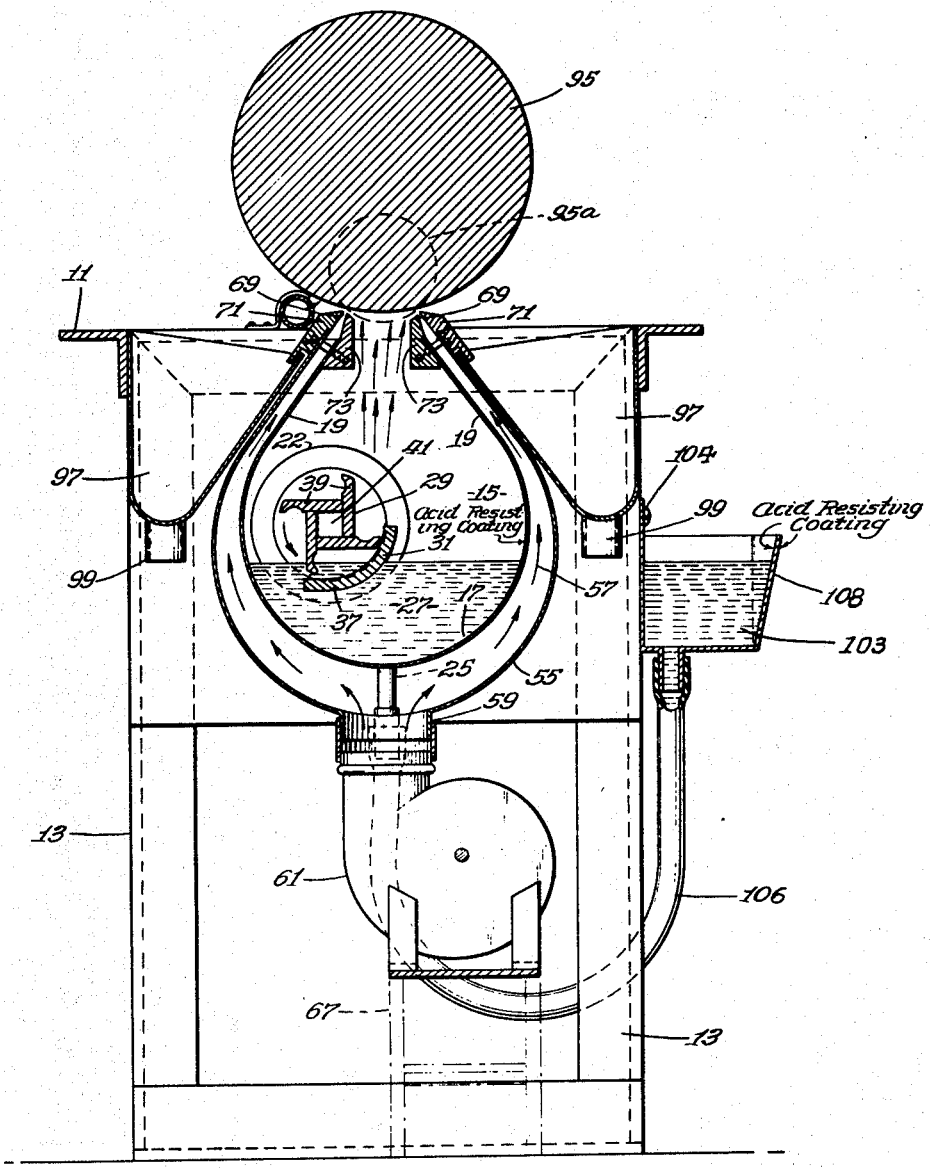
Fig. 3 is a sectional view taken on line 3—3 of Fig. 2.

The acid, or other etching fluid, indicated in Fig. 3 at 27, is atomized and applied to the surface which is to be etched by means of a rotatable impeller member 29 which is desirably provided with a deflector 37. The deflector 37, if used, may comprise a longitudinally extending arcuate member (about 90°) which is attached to the bearing members 33 by means of brackets 34 at each end of the acid tank 15, in a position adapted to direct the acid thrown from the impeller 29 against the surface to be etched. The deflector 37 may be fabricated from steel and coated with a suitable acid-resisting material, or it may be fabricated from acid-resisting plastic or the like. The impeller 29 of the apparatus illustrated in the drawings comprises a series of paddle members 39 made from an acid-resisting plastic such as that sold under the trade name of Lucite, or some other acid-resisting material. The paddle members 31 are affixed to a suitable rotatable shaft 41; one end of the shaft 41 extends through an opening in one end of the acid tank 15 for connection to a motor 46 or other rotating means, as illustrated in Fig. 2.

The impeller 29 is supported for free, high speed rotation within the acid container 15 by suitable bearings 33 (Fig. 2). The impeller shaft 41 has an enlarged baffle portion 45, intermediate the ends of the paddle members 39 and the end of the shaft 41, which is adapted to cooperate with a cone-shaped bearing seal 34a through which a stream of pressure air is passed. The bearings 33 are thus protected from the corrosive action of the etching fluid by the stream of pressure air which sweeps all foreign materials out of the protecting cone 34.

The motor 46 which is used for rotating the impeller 29 is supported on a bracket 47 affixed to the frame upright 13, and is connected to the impeller shaft 41 by a belt 49 and suitable pulleys 51 and 53. A constant speed motor with variable speed pulleys is desirable, so that the atomization of the acid may be closely controlled. The impeller 29 should be rotated at relatively high speed in order to accomplish good atomization and an even distribution of the etching fluid along the surface which is to be etched. Impeller speeds upwards of about 1200 R. P. M. have been found to be satisfactory.

The acid tank 15 is surrounded by an air jacket 55 fabricated from sheet material. The air jacket 55 is shaped to conform with the shape of the acid tank 15, and is large enough to allow for the free circulation of air around the outside of the acid tank as is shown by the arrows 57. The air inlet 59 to the jacket 55 is conveniently provided at the bottom portion of the jacket 55 and a heavy duty, centrifugal blower 61 is supported adjacent the air inlet 59 for supplying the needed pressure air. An outlet pipe 63 is provided at each end of the air jacket to connect the conical bearing seal 34, before described, with a source of pressure air. The blower 61 is adapted to be powered by a motor 65 and both the motor 65 and the blower 61 are supported on a suitable frame 67.

Two longitudinally extending air nozzles or slots 69 are formed between the outside surface of the acid tank 15 and the inner surface of the air jacket 55 by means of longitudinally extending structural members 71 and 73 shaped as shown in the drawings (Figs. 3 and 4). The members 71 and 73 are joined by a series of counter-sunk machine screws 75 which are adapted to engage threaded holes in the inner member 73. The members 71 and 73 are maintained in their relative positions by means of adjusting screws 77 which are threaded into the outer member 71 and which have extensions adapted to press upon the upper walls 19, of the acid container 15, and on the inner structural member 73.

Adjusting the pairs of screws 75 and 77 thus provides a convenient means for carefully adjusting the width of the air nozzles or slots 69. The inner members 73 are attached to the ends of the acid tank 15 and to the frame 11 by means of machine screws 79 and, thus, provide additional longitudinal stiffening of the structure. The inner members 73 are shaped as shown in the drawings so as to provide a throat 81 having parallel walls 83 and 85 for guiding the etching fluid spray against the surface to be etched as indicated by the arrow 87 in Fig. 4.

A water pipeline 89 is supported on the frame 11 by brackets 91 and extends longitudinally in close proximity to the air slot 69. The water pipeline 89 has a continuous slot 93 on the inner side adapted to direct water from the pipeline 89 onto the surface of the cylinder 95, thus halting the etching action on all sections of the cylinder not in immediate contact with the atomized etching fluid. Drain trays 97 are provided on each side of the structure between the air jacket 55 and the outer frame members 11. The trays 97 may be fabricated from sheet metal and are, if provided with a drain outlet 99, connected to a sewer or other disposal means. The outer longitudinal air slot members 71 are shaped with an added flanged portion 101 adapted to provide a leakproof bond between the member 71 and the drain trays 97 (Fig. 4).

In order to control the level of the etching fluid 27 in the acid tank 15, an adjustable height, filling-container 103 is provided. This is removably fastened to a bracket 104 on the frame 13 and is connected to the inlet 25 of the acid container 15 by means of a gum rubber or other acid-resisting, flexible hose 106. All the surfaces of the filling-container 103 are covered with an acid-resisting coating. It is advantageous if one of the sides of the container 103 is formed into a spout or guide 108 so that the etching solution may be conveniently poured from the filling container 103 when it is desired to drain the acid from the main acid tank 15.

As printing cylinders vary considerably in length and in diameter, a cylinder etching machine should include means for accommodating cylinders of varying dimensions as is shown in Fig. 3 as 95 and 95a. In the particular machine shown in the drawings, this means includes an adjustable bearing support structure for the cylinder 95 which is to be etched. This structure includes two screw jack members 105 actuated by knurled knobs 107. The jacks 105 are rigidly attached at each end of the frame 11. An extensible portion 109 of each jack 105 terminates in a yoke section 111 adapted to support ball bearing rings 113 which are slipped over the ends of the printing cylinder shaft 115 to facilitate rotatable movement. The adjustment of the distance between the surface of the cylinder being etched and the outlet of the air slots 69 is a most important adjustment in the successful operation of the etching machine. For this reason, the jack members 105 desirably have low-pitch threads so that the gap between air slot 69 and the cylinder 95 may be closely adjusted. Usually a spacing of from about $\frac{1}{16}$ to $\frac{1}{8}$ of an inch will be found satisfactory in the illustrated apparatus. In place of the knurled manual adjustment knobs 107, hydraulic or power actuated jacks may be used.

The motor 43 for rotating the cylinder 95 which is to be etched is adjustably supported on the frame 11 by a sliding plate member 117 which may be moved back and forth along a line normal to the cylinder shaft 115 so as to tighten or loosen a driving belt 119. The sliding plate 117 is locked in by means of a screw locking means 121. A pulley 123 on the motor drive shaft is operatively connected to a pulley 125 which is adapted to fit on the cylinder shaft 115 by means of the belt 119. During the actual etching operation, it is desirable that the printing cylinder 95 which is to be etched should be rotated at a relatively low speed. Tests indicate the linear speed of the surface being etched should be within the range of from about 25 to 40 feet per minute. For a cylinder 10 inches in diameter, this requires that it be rotated at from 10 to 15 R. P. M.

To start the machine in operation, the acid or other etching fluid is poured into the filling container 103 until the liquid level in the acid tank 15 is high enough to allow the impeller blades 39 to dip into the acid about ¼ inch at the lowest postion in their arc of travel. The cylinder 95 which has the ball bearing rings 113 in place on its shaft 115, is cradled in the yokes 111 provided for the bearings 113 on the adjustable supporting members 109. The height of the yokes 111 is adjusted so that the gap between the air slot 69 and the surface of the cylinder 95 is from about $\frac{1}{16}$ to $\frac{1}{8}$ of an inch. The cylinder driving motor 43 is energized and the speed of rotation is adjusted to conform with the etching conditions required. The air blower 61 is started and then the spray from the water pipeline 89 is turned on. The impeller 29 is energized and its speed is adjusted to provide the most desirable atomization of the etching solution 27. The etching is continued until the ink receiving recesses have been etched to the required depth and then the impeller 29 is stopped and the cylinder is rotated in the water spray and air blast. After the surface of the cylinder 95 is thoroughly washed, the water from the manifold 89 may be turned off and the cylinder 95 may be rotated in the air blast from the slots 69 to dry it off.

It has been found that a pressure differential of from about 1 to 5 pounds per square inch across the pressure air barrier located intermediate the opening of the air slot 69 and the cylinder 95 effectively confines the acid spray to the areas of the cylinder directly above the slot 81 in the acid tank 15. The air also keeps the water spray from entering the acid tank 15 and diluting the acid. In operation, one section of the cylinder 95 passes through the acid solution spray, the acid solution is doctored off by the air blast from the adjacent slot, the surface is then washed with water, and the cylinder 95 rotates around to the second air slot where it may be partially dried by the blast and again enters the acid spray. The excess wash water runs down the two drain trays 97 and out the drain pipe provided.

When etching relatively short cylinders, it will be found desirable to partially cover both ends of the impeller housing with an acid-resisting removable baffle 127 as illustrated in Fig. 7. The baffle 127 is desirably a plate of Lucite or other acid resisting plastic which is held in position by means of cross members 129 and bolt and wing nut assembly 131. This arrangement confines the discharge of the etching fluid to the length of the cylinder which is to be etched. The wash water is confined along an equivalent length of the water pipeline 89 by means of a removable sleeve member 133 which is held in position by a strap locking means as shown at 135.

The modified form of the apparatus illustrated in Figs. 5 and 6 is essentially similar to the machine which has been described in the foregoing, with this one important exception:

In the modified apparatus, the etching fluid is directed against the surface to be etched by means of a liquid jet atomizing structure 137 which is operated by a plurality of spaced air jets. The atomizing structure 137 includes a pair of complementary, machined plate members 139 which are designed so as to provide a plurality of regularly spaced atomizing jet chambers 141 which open into wedge-shaped throats 143 wherein are disposed deflector members 145 for dividing and directing the atomized stream so as to assure full coverage at the open upper end of the throat. The complementary plate members 139 are bolted together and are held in place within the acid tank 15a by means of cleats or the like (not shown). A jet tube 149 is provided in each of the atomizing chambers 141 and this tube is connected to a suitable source of pressure air through a conduit 151. Particularly satisfactory results have been obtained when using a jet tube having an orifice about $\frac{1}{16}$ inch in diameter and an air pressure of about 15 pounds per square inch gauge. The air slots 69a, the outer air jacket 55a, the water pipeline 89a, and the vertically adjustable support means for the cylinder which is to be etched are exactly the same in this apparatus as in the previously described structure.

Tests have shown that the etching apparatus which has been described in the foregoing, is capable of producing gravure cylinders of particularly high quality. The contact between etching fluid and the rotating cylinder is closely controlled by the doctoring action of the air blasts and by the dilution of the etching solution by the wash water. The finest lands or raised dots are freed from all mechanical contact and are subjected only to the acid spray, the pressure air barrier, and the water spray. Thus the improved method of the present invention accomplishes the highly desirable function of making it possible to carry out the continuous and efficient etching and washing of printing surfaces.

The features of my invention that are believed to be new are expressly set forth in the appended claims.

I claim:

1. The method for etching cylinders wherein longitudinal segments of the surface of the cylinder are consecutively subjected to an etching fluid spray, an air blast for doctoring off said etching fluid, a water spray, and an air blast for doctoring off the excess water, said steps being repeated until the surface of the cylinder is completely etched.

2. In an etching machine, means providing an etching zone, means defining a first air doctor zone, means defining a washing zone, means defining a second air doctor zone, and a source of pressure air connected to said first and said second air doctor zones, said etching zone being located intermediate said air doctor zones and said washing zone being located adjacent said second air doctor zone, and means for repeatedly passing the surface to be etched consecutively through said zones in a manner such that said surface is successively and repeatedly exposed to said first air doctor zone, said etching zone, said second air doctor zone, and said washing zone.

3. In combination in an etching machine for etching the peripheral surface of a printing cylinder, means for supporting the cylinder to be etched for rotation about a generally horizontal axis, a trough having a narrow, longitudinally extending, open mouth whose major axis is generally parallel with the axis of rotation of the cylinder to be etched, the trough and cylinder being so supported and related that the peripheral surface of the cylinder although out of contact with the trough provides an effective closure for the open mouth, means for projecting etching liquid in the trough against that portion of the peripheral surface of the cylinder which closes the mouth, means for rotating the cylinder to cause successive portions of the peripheral surface of the cylinder to move out of register with the open mouth, means for projecting water against the peripheral surface of the cylinder outside of the trough after it has moved out of register with the mouth, and means for discharging an air jet against the peripheral surface of the cylinder.

4. In combination in an etching machine for etching the peripheral surface of a printing cylinder, means for supporting the cylinder to be etched for rotation about a generally horizontal axis, a trough having a narrow, longitudinally extending, open mouth whose major axis is generally parallel with the axis of rotation of the cylinder to be etched, the trough and cylinder being so supported and related that the peripheral surface of the cylinder although out of contact with the trough provides an effective closure for the open mouth, means for projecting etching liquid in the trough against that portion of the peripheral surface of the cylinder which closes the mouth, means for rotating the cylinder to cause successive portions of the peripheral surface of the cylinder to move out of register with the open mouth, means for projecting water against the peripheral surface of the cylinder outside of the trough after it has moved out of register with the mouth, and means for projecting an air jet against the peripheral surface of the cylinder, the air-jet-projecting-means being located between the mouth of the trough and the water-projecting-means.

5. In combination in an etching machine for etching the peripheral surface of a printing cylinder, means for supporting the cylinder to be etched for rotation about a generally horizontal axis, a trough having a narrow, longitudinally extending, open mouth whose major axis is generally parallel with the axis of rotation of the cylinder to be etched, the trough and cylinder being so supported and related that the peripheral surface of the cylinder although out of contact with the trough provides an effective closure for the open mouth, means for projecting etching liquid in the trough against that portion of the peripheral surface of the cylinder which closes the mouth, means for rotating the cylinder to cause successive portions of the peripheral surface of the cylinder to move out of register with the open mouth, means for projecting air jets against the peripheral surface of the cylinder, the air-jet-projecting-means being positioned to bound the sides of the mouth which are parallel to the major axis thereof, and means for projecting water against the peripheral surface of the cylinder outside of the trough immediately after it has moved out of register with the mouth and the air-jet-projecting-means which bounds the side of the mouth.

6. In combination in an etching machine for etching the peripheral surface of a printing cylinder, means for supporting the cylinder to be etched for rotation about a generally horizontal axis, a trough having a narrow, longitudinally extending open mouth whose major axis is generally parallel with the axis of rotation of the cylinder to be etched, the trough and cylinder being so supported and related that the peripheral surface of the cylinder although out of contact with the trough provides an effective closure for the open mouth, means for projecting etching liquid in the trough against that portion of the peripheral surface of the cylinder which closes the mouth, means disposed along each of the sides of the trough which are parallel to the major axis thereof, for projecting an elongated air jet against the peripheral surface of the cylinder, means for rotating the cylinder to cause successive portions of the peripheral surface of the cylinder to move out of register with the open mouth, and across the air-jet-projecting-means, and means for continuously projecting water against the peripheral surface of the cylinder along its entire length after it has moved out of register with the mouth.

CHARLES L. HENDERSON.

REFERENCES CITED

The following references are of record in the file of this patent:

UNITED STATES PATENTS

| Number | Name | Date |
|---|---|---|
| 590,966 | Cornwall | Oct. 5, 1897 |
| 1,166,378 | Levy | Dec. 28, 1915 |
| 2,293,201 | Gaebel | Aug. 18, 1942 |
| 2,360,676 | Henderson | Oct. 17, 1944 |

FOREIGN PATENTS

| Number | Country | Date |
|---|---|---|
| 229,956 | Great Britain | Mar. 5, 1925 |